(12) United States Patent
Tajima et al.

(10) Patent No.: US 9,110,687 B2
(45) Date of Patent: Aug. 18, 2015

(54) INFORMATION PROCESSING APPARATUS AND OPERATION CONTROL METHOD

(71) Applicant: KABUSHIKI KAISHA TOSHIBA, Minato-ku, Tokyo (JP)

(72) Inventors: Takeshi Tajima, Ome (JP); Tomotaka Mori, Tachikawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 126 days.

(21) Appl. No.: 14/050,096

(22) Filed: Oct. 9, 2013

(65) Prior Publication Data
US 2014/0118263 A1    May 1, 2014

(30) Foreign Application Priority Data
Oct. 25, 2012 (JP) .................................. 2012-235900

(51) Int. Cl.
G06F 3/0488 (2013.01)
G06F 9/44 (2006.01)
G06F 3/0489 (2013.01)

(52) U.S. Cl.
CPC .......... *G06F 9/4443* (2013.01); *G06F 3/04895* (2013.01)

(58) Field of Classification Search
CPC .............................. G06F 3/016; G06F 3/0488
USPC .......................... 345/156, 157, 168, 169, 173
See application file for complete search history.

(56) References Cited

U.S. PATENT DOCUMENTS

| | | | |
|---|---|---|---|
| 5,754,798 A | 5/1998 | Uehara et al. | |
| 7,420,544 B2 | 9/2008 | Ono et al. | |
| 2003/0067446 A1 | 4/2003 | Ono et al. | |
| 2007/0005164 A1* | 1/2007 | Kuramoto et al. | 700/94 |
| 2012/0311586 A1* | 12/2012 | Inagaki | 718/100 |

FOREIGN PATENT DOCUMENTS

| | | |
|---|---|---|
| JP | 07-319569 A | 12/1995 |
| JP | 2003-084892 A | 3/2003 |
| JP | 2003-157140 A | 5/2003 |

\* cited by examiner

*Primary Examiner* — Ricardo L Osorio
(74) *Attorney, Agent, or Firm* — Knobbe, Martens, Olson & Bear LLP

(57) ABSTRACT

According to one embodiment, an information processing apparatus includes a state change controller and a display processor. When a first key of a keyboard is pressed, the state change controller changes a state of a first operational environment. The display processor displays a first message indicative of a current state of the first operational environment in an informing area of a display screen for a first duration of time. When a second message indicative of a past state of the first operational environment is displayed by the display processor for the first duration of time in the informing area, the display processor display the first message in the informing area together with the second message.

10 Claims, 11 Drawing Sheets

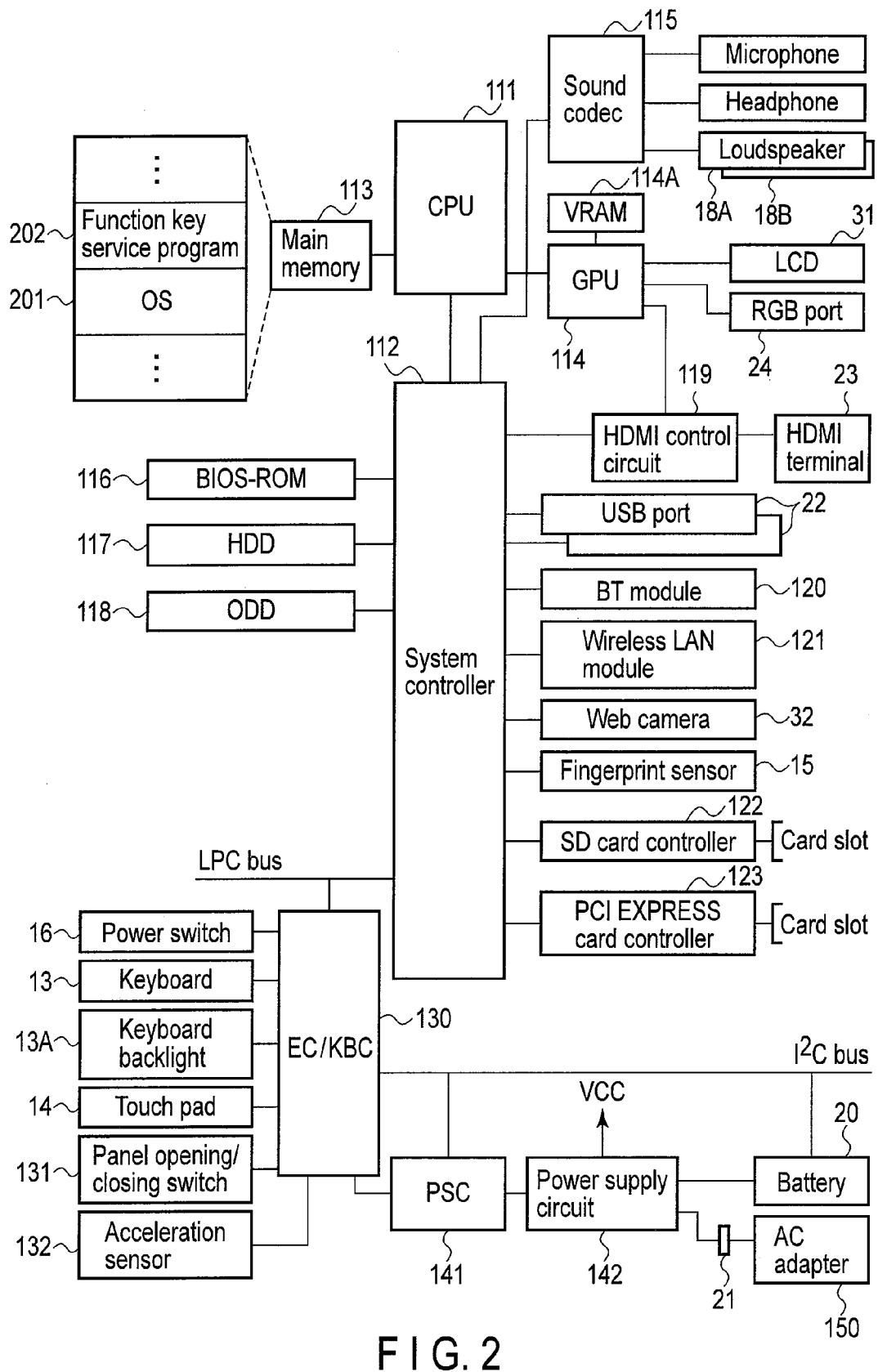
F I G. 2

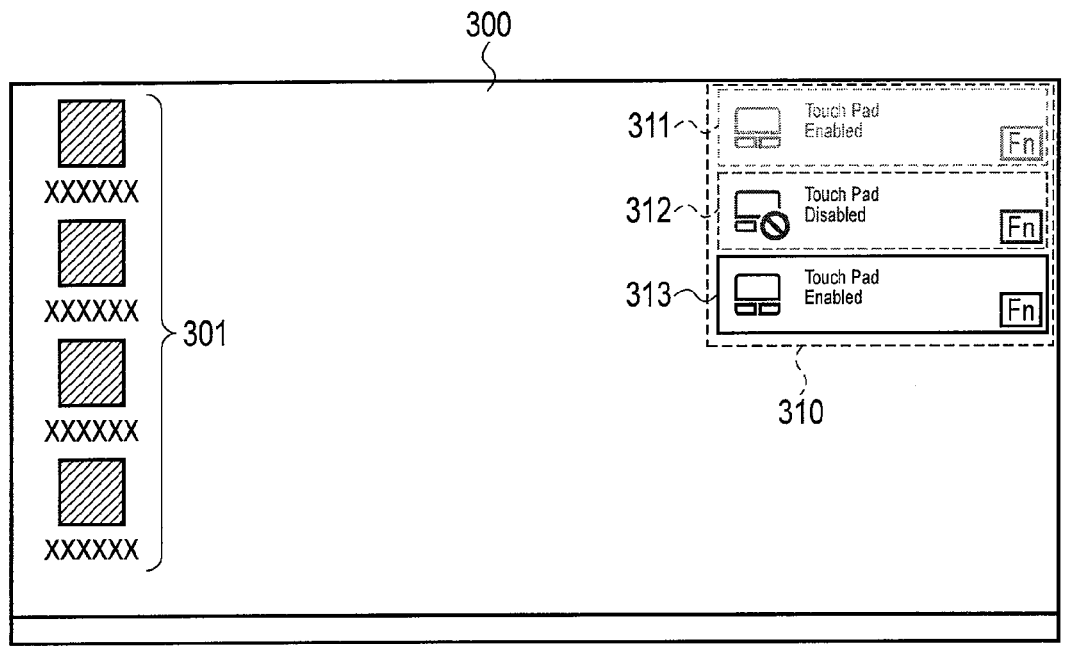
F I G. 5
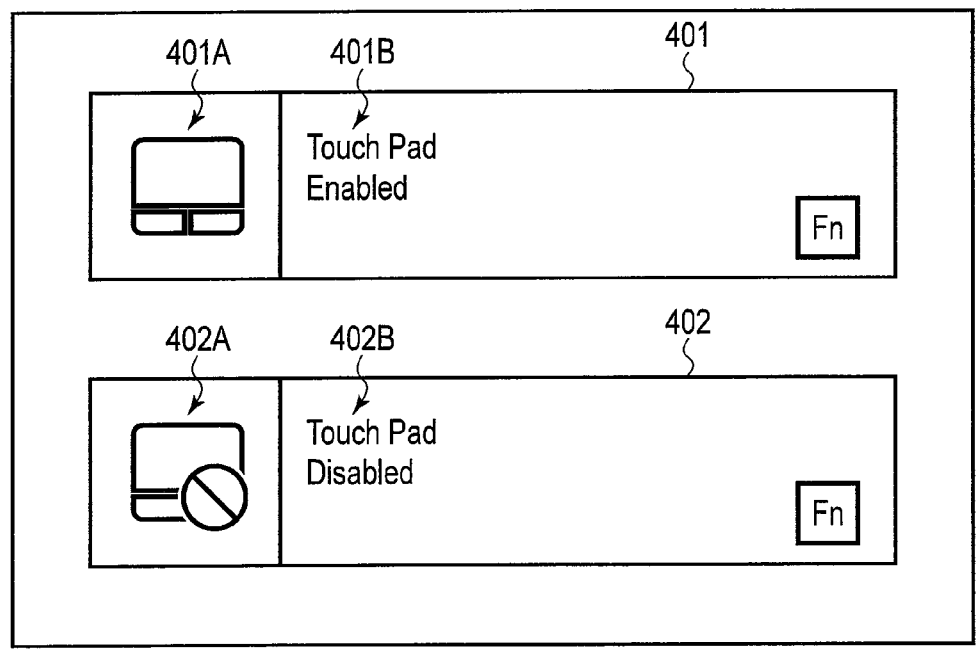
F I G. 6

INFORMATION PROCESSING APPARATUS AND OPERATION CONTROL METHOD

CROSS-REFERENCE TO RELATED APPLICATIONS

This application is based upon and claims the benefit of priority from Japanese Patent Application No. 2012-235900, filed Oct. 25, 2012, the entire contents of which are incorporated herein by reference.

FIELD

Embodiments described herein relate generally to an information processing apparatus, and an operation control method applied to the apparatus.

BACKGROUND

In recent years, various portable personal computers of notebook type or laptop type have been developed. Such a computer uses a function of using a function key to change its operational environment. The user can readily change the operational environment by only pressing a specific key in combination with a function key.

There is also known a technique of presenting to the user the current state of the operational environment which has been changed using a function key.

It may be difficult for the user to identify whether the operation environment has been actually changed or state transition which has been performed for the operational environment.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary block diagram showing the system configuration of the information processing apparatus according to the embodiment.

FIG. 5 is an exemplary view showing a case in which the information processing apparatus according to the embodiment groups and displays three messages in a stack.

FIG. 6 is an exemplary view showing a group of messages for informing the user of touch pad ON/OFF switching, which is used by the information processing apparatus according to the embodiment.

DETAILED DESCRIPTION

Various embodiments will be described hereinafter with reference to the accompanying drawings.

In general, according to one embodiment, an information processing apparatus includes a state change controller and a display processor. When a first key of a keyboard is pressed, the state change controller changes a state of a first operational environment. The display processor displays a first message indicative of a current state of the first operational environment in an informing area of a display screen for a first duration of time. when a second message indicative of a past state of the first operational environment is displayed by the display processor for the first duration of time in the informing area, the display processor display the first message in the informing area together with the second message The arrangement of an information processing apparatus according to the embodiment will be described with reference to FIG. 1. The information processing apparatus can be implemented as, for example, a portable personal computer of notebook type, a tablet terminal, or one of other various information processing apparatuses. Assume that the information processing apparatus is implemented as a portable personal computer 10 of notebook type.

Figure 1:
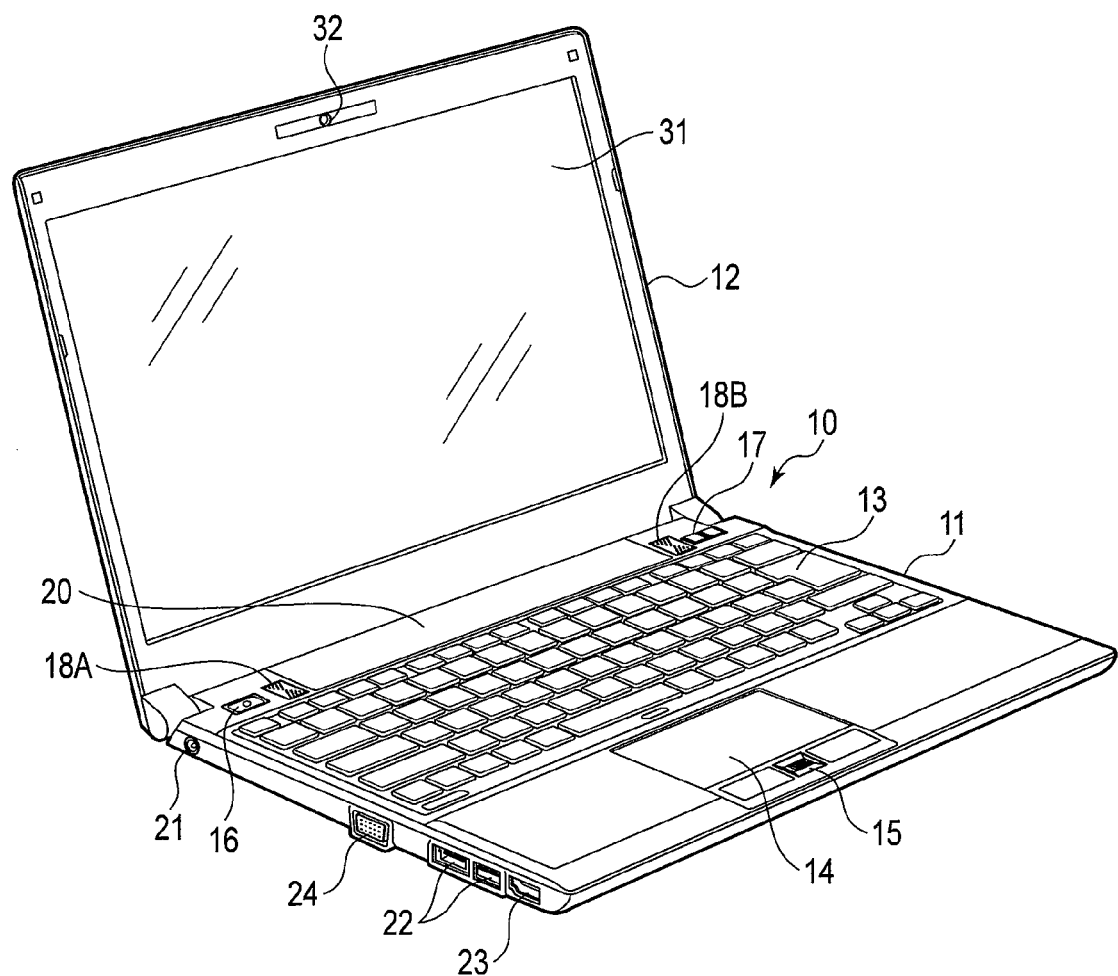
FIG. 1 is an exemplary perspective view showing the outer appearance of an information processing apparatus according to an embodiment.

FIG. 1 is a perspective view when viewed from the front side of the computer 10 with a display unit open. The computer 10 is configured to receive power from a battery 20. The computer 10 includes a computer main body 11 and a display unit 12. The display unit 12 incorporates a display device like a liquid crystal display (LCD) 31. Furthermore, a camera (Web camera) 32 is arranged in the upper end portion of the display unit 12.

The display unit 12 is attached to the computer main body 11 to be pivotable between an open position where the upper surface of the computer main body 11 is exposed, and a closed position where the display unit 12 covers the upper surface of the computer main body 11. The computer main body 11 has a thin, box-shaped housing, and includes, on its upper surface, a keyboard 13, a touch pad 14, a fingerprint sensor 15, a power switch 16 to power on/off the computer 10, several function buttons 17, and loudspeakers 18A and 18B.

The computer main body 11 includes a power supply connector 21. The power supply connector 21 is provided on a side surface, for example, the left surface of the computer main body 11. An external power supply is detachably connected to the power supply connector 21. An AC adapter can be used as an external power supply. The AC adapter serves as a power supply apparatus for converting commercial power (AC power) into DC power.

The battery 20 is, for example, detachably attached to the rear end portion of the computer main body 11. The battery 20 may be a battery incorporated in the computer 10.

The computer 10 is driven by power from the external power supply or the battery 20. If the external power supply is connected to the power supply connector 21 of the computer 10, the computer 10 is driven by power from the external power supply. Power from the external power supply is also used to charge the battery 20. While the external power supply is not connected to the power supply connector 21 of the computer 10, the computer 10 is driven by power from the battery 20.

Furthermore, the computer main body 11 includes several USB ports 22, an HDMI (High-Definition Multimedia Interface) output terminal 23, and an RGB port 24.

FIG. 2 shows the system configuration of the computer 10. The computer 10 includes a CPU 111, a system controller 112, a main memory 113, a graphics processing unit (GPU) 114, a sound codec 115, a BIOS-ROM 116, a hard disk drive (HDD) 117, an optical disk drive (ODD) 118, a BT (Bluetooth®) module 120, a wireless LAN module 121, an SD card controller 122, a PCI EXPRESS card controller 123, an embedded controller/keyboard controller IC (EC/KBC) 130, a keyboard backlight 13A, a panel opening/closing switch 131, an acceleration sensor 132, a power supply controller (PSC) 141, and a power supply circuit 142.

The CPU 111 serves as a processor for controlling the operation of each component of the computer 10. The CPU 111 executes various software programs loaded from the HDD 117 into the main memory 113. The software programs include an operating system (OS) 201 and various application programs. The software programs also include a function key service program 202. The function key service program 202 is used to execute a function assigned to each combination of a specific key and a function key (Fn key) of the keyboard 13.

The CPU 111 also executes the basic input/output system (BIOS) stored in the BIOS-ROM 116 as a non-volatile memory. The BIOS is a system program for hardware control.

The GPU 114 is a display controller for controlling the LCD 31 used as a display monitor of the computer 10. Based on display data stored in a video memory (VRAM) 114A, the GPU 114 generates a display signal (LVDS signal) to be supplied to the LCD 31. The GPU 114 can also generate an analog RGB signal and HDMI video signal based on the display data. The analog RGB signal is supplied to an external display via the RGB port 24. The HDMI output terminal 23 can send the HDMI video signal (uncompressed digital video signal) and a digital audio signal to the external display through one cable. An HDMI control circuit 119 serves as an interface for sending the HDMI video signal and the digital audio signal to the external display via the HDMI output terminal 23.

The system controller 112 serves as a bridge device for connecting the CPU 111 with each component. The system controller 112 incorporates a serial ATA controller for controlling the hard disk drive (HDD) 117 and the optical disk drive (ODD) 118. Furthermore, the system controller 112 executes communication with each device on an LPC (Low PIN Count) bus.

The EC/KBC 130 is connected to the LPC bus. The EC/KBC 130, power supply controller (PSC) 141, and battery 20 are interconnected via a serial bus such as an $I^2C$ bus.

The EC/KBC 130 serves as a power management controller for executing power management for the computer 10, and is implemented as, for example, a one-chip microcomputer incorporating a keyboard controller for controlling the keyboard (KB) 13, the touch pad 14, and the like. The EC/KBC 130 has a function of powering on and off the computer 10 according to a user operation for the power switch 16. The EC/KBC 130 and power supply controller (PSC) 141 cooperate with each other to control to power on and off the computer 10. Upon receiving an ON signal transmitted by the EC/KBC 130, the power supply controller (PSC) 141 controls the power supply circuit 142 to power on the computer 10. Upon receiving an OFF signal transmitted by the EC/KBC 130, the power supply controller (PSC) 141 controls the power supply circuit 142 to power off the computer 10. Even while the computer 10 is OFF, the EC/KBC 130, power supply controller (PSC) 141, and power supply circuit 142 operate by power from the battery 20 or an AC adapter 150.

Moreover, the EC/KBC 130 can turn on/off the keyboard backlight 13A arranged on the rear surface of the keyboard 13. The EC/KBC 130 is connected to the panel opening/closing switch 131 configured to detect opening/closing of the display unit 12. Even if the panel opening/closing switch 131 detects that the display unit 12 is opened, the EC/KBC 130 can power on the computer 10.

The power supply circuit 142 generates power (operation power) to be supplied to each component using power from the battery 20 or that from the AC adapter 150 connected to the computer main body 11 as an external power supply.

A message informing operation used in this embodiment will be described with reference to FIGS. 3 to 5. When one or more specific keys of the keyboard 13 are pressed, the above-described function key service program 202 executes a function of changing a given operational environment of the computer 10. As the one or more specific keys, for example, a combination of a function key (Fn key) and a specific key of the keyboard 13 can be used. Examples of the operational environment of the computer 10 which can be changed by the function key service program 202 include an operational environment associated with the power-saving setting of the computer 10, that associated with the enabled or disabled state of the touch pad 14 of the computer 10, that associated with the ON or OFF state of the wireless communication device of the computer 10, that associated with the ON or OFF state of the keyboard backlight 13A of the computer 10, and that associated with the enabled or disabled state of a keyboard overlay (numerical overlay or cursor overlay).

In other words, functions (function key services) supported by the function key service program 202 are a touch pad ON/OFF function, a power plan setting function, a numerical overlay function, a cursor overlay function, a wireless communication function ON/OFF function, a keyboard backlight ON/OFF function, and the like.

The touch pad ON/OFF function is used to switch the state of the touch pad 14 between the enabled state and the disabled state. The touch pad ON/OFF function is assigned to the combination of the Fn key and F5 key (Fn+F5). Every time the F5 key is pressed in combination with the Fn key, the function key service program 202 changes the state of the touch pad 14 from the enabled state to the disabled state or from the disabled state to the enabled state. If the touch pad 14 is in the enabled state and then the user presses Fn+F5, the function key service program 202 changes the state of the touch pad 14 to the disabled state. On the other hand, if the touch pad 14 is in the disabled state and then the user presses Fn+F5, the function key service program 202 changes the state of the touch pad 14 to the enabled state.

The power plan setting function is used to change the current state (current mode) of a power plan (power-saving setting) to one of four states (a balanced mode, eco mode, power-saving mode, high-performance mode) which have different combinations of system performances and power consumptions. The power plan setting function is assigned to the combination of the Fn key and F2 key (Fn+F2). Every time the F2 key is pressed in combination with the Fn key, the function key service program 202 changes the state of the power plan (power-saving setting) from the current state to the next state so as to change the state of the power plan (power-saving setting) in the order of balanced mode→eco mode→power-saving mode→high-performance mode→balanced mode . . . .

The numerical overlay function is used to switch between the enabled state and disabled state of a function of using, as a ten-key pad (numerical keys), several keys on each of which a number is printed in a lower right portion of the key. The numerical overlay function is assigned to the combination of the Fn key and F11 key (Fn+F11). Every time the F11 key is pressed in combination with the Fn key, the function key service program 202 changes the state of the numerical overlay function from the enabled state to the disabled state or from the disabled state to the enabled state. If the numerical overlay function is in the enabled state, and then the user presses Fn+F11, the function key service program 202 changes the state of the numerical overlay function to the disabled state. On the other hand, if the numerical overlay function is in the disabled state, and then the user presses Fn+F11, the function key service program 202 changes the state of the numerical overlay function to the enabled state.

The cursor overlay function is used to switch between the enabled state and disabled state of a function of using, as cursors (arrow keys), several keys of the keyboard 13 on each of which an arrow is printed in the lower right portion of the key. The cursor overlay function is assigned to the combination of the Fn key and F10 key (Fn+F10). Every time the F10 key is pressed in combination with the Fn key, the function key service program 202 changes the state of the cursor overlay function from the enabled state to the disabled state or from the disabled state to the enabled state. If the cursor overlay function is in the enabled state and then the user presses Fn+F10, the function key service program 202 changes the state of the cursor overlay function to the disabled state. On the other hand, if the cursor overlay function is in the disabled state and then the user presses Fn+F10, the function key service program 202 changes the state of the cursor overlay function to the enabled state.

The wireless communication function ON/OFF function is used to switch the state of a wireless communication device (both the BT module 120 and the wireless LAN module 121 in this example) between an ON state and an OFF state. The wireless communication function ON/OFF function is assigned to the combination of the Fn key and F8 key (Fn+F8). Every time the F8 key is pressed in combination with the Fn key, the function key service program 202 changes the state of the wireless communication device from the ON state to the OFF state or from the OFF state to the ON state. If the wireless communication device is in the ON state and then the user presses Fn+F8, the function key service program 202 changes the state of the wireless communication device to the OFF state. On the other hand, if the wireless communication device is in the OFF state and then the user presses Fn+F8, the function key service program 202 changes the state of the wireless communication device to the ON state.

The keyboard backlight ON/OFF function is used to switch the state of the keyboard backlight 13A between an ON state and an OFF state. The keyboard backlight ON/OFF function is assigned to the combination of the Fn key and Z key (Fn+Z). Every time the Z key is pressed in combination with the Fn key, the function key service program 202 changes the state of the keyboard backlight 13A from the ON state to the OFF state or from the OFF state to the ON state. If the keyboard backlight 13A is in the ON state and then the user presses Fn+Z, the function key service program 202 changes the state of the keyboard backlight 13A to the OFF state. On the other hand, if the keyboard backlight 13A is in the OFF state and then the user presses Fn+Z, the function key service program 202 changes the state of the keyboard backlight 13A to the ON state.

Furthermore, the function key service program 202 uses an informing service module incorporated in the OS 201 to inform the user of the current state of the operational environment changed by the function key service. In this case, the function key service program 202 uses the informing service module to display, on the display screen, a message indicating the current state of the changed operational environment. This message is a temporary message which is displayed for a predetermined time.

Assume that the user presses Fn+F5 when the touch pad 14 is in the disabled state. The function key service program 202 changes the state of the touch pad 14 to the enabled state. The function key service program 202 displays a message 311 indicating the current state of the touch pad 14 after the change operation (that is, indicating that the touch pad is in the enabled state), as shown in FIG. 3.

Figure 3:
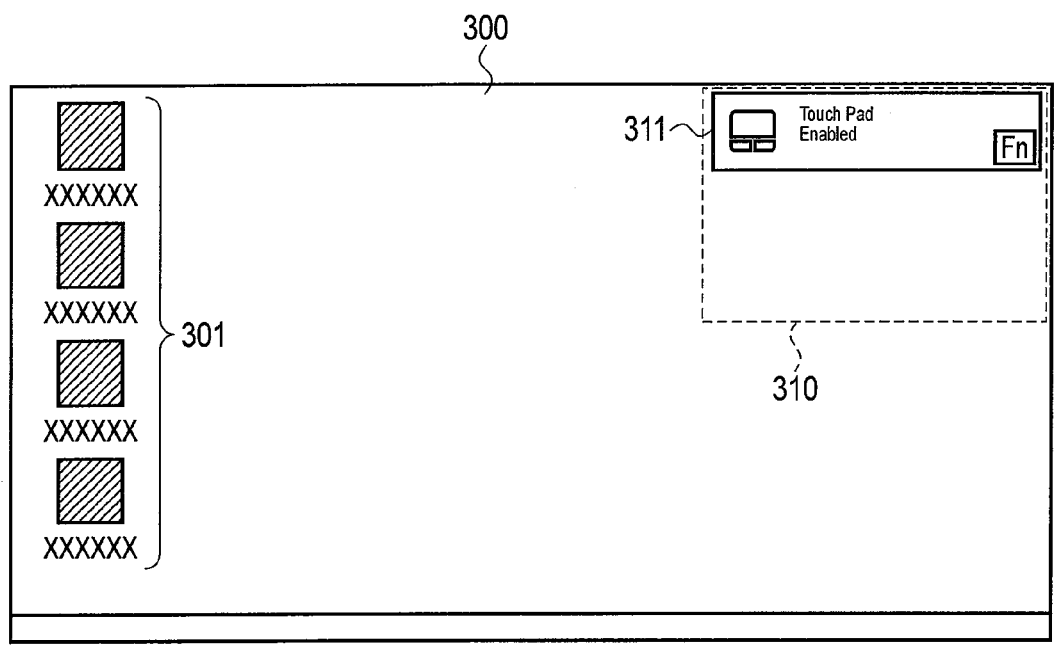
FIG. 3 is an exemplary view showing a case in which the information processing apparatus according to the embodiment displays a message.

As shown in FIG. 3, the message 311 is displayed in an upper right informing area 310 of a display screen 300. The display screen 300 is a so-called desktop screen, on which various icons 301, various application windows, and the like can be displayed.

The message 311 is a small window. The message 311 pops up in front of other arbitrary windows in the informing area 310. The displayed message 311 is automatically faded out, and then disappears from the display screen 300. In other words, the function key service program 202 displays the message 311 in the informing area 310 for a predetermined time (for example, 9 sec). Immediately after the message 311 is displayed in the informing area 310 or when a given time elapses after the start of display of the message 311, the transparency of the window of the message 311 starts to continuously increase. With this processing, the message 311 disappears 9 sec after the start of the display operation.

Figure 4:
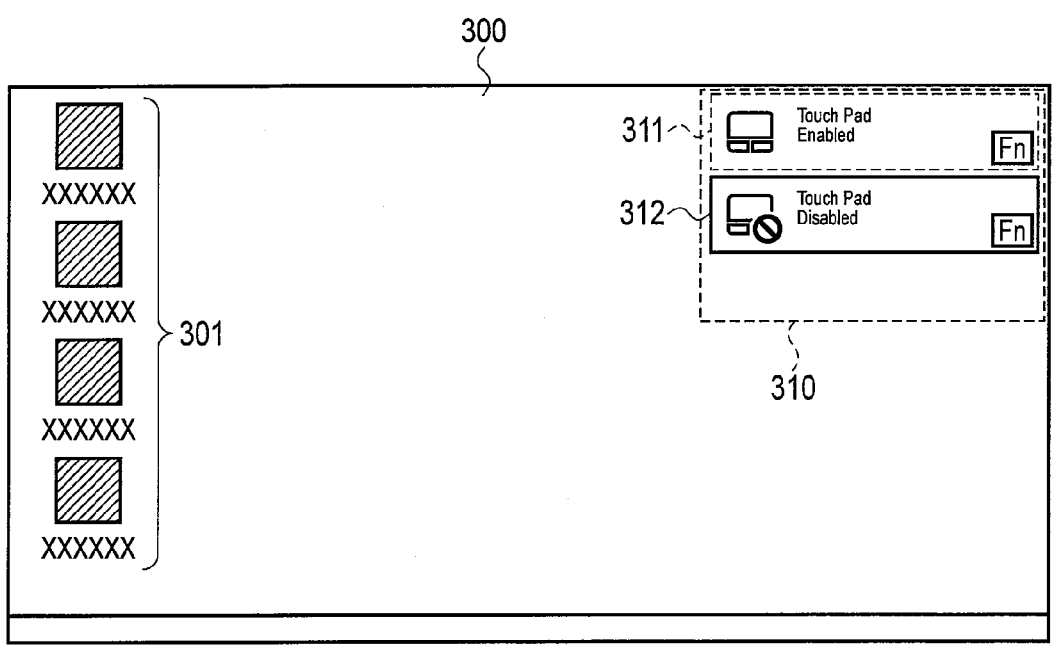
FIG. 4 is an exemplary view showing a case in which the information processing apparatus according to the embodiment groups and displays two messages in a stack.

FIG. 4 shows contents of the informing area 310 when the user presses Fn+F5 again while the message 311 is displayed. In response to press of Fn+F5, the function key service program 202 changes the state of the touch pad 14 to the disabled state. The function key service program 202 displays a message 312 indicating the current state of the touch pad 14 after the change operation (that is, indicating that the touch pad is in the disabled state), as shown in FIG. 4. As shown in FIG. 4, the message 312 is displayed in the informing area 310 together with the already displayed message 311. The message 311 indicates the past state of the touch pad 14. The message 312 is displayed in the informing area 310 so that the messages 311 and 312 are stacked each other in a vertical direction. More specifically, the message 312 is displayed, for example, below the old message 311 without changing the display position of the already displayed old message 311. As described above, the two messages 311 and 312 are displayed in the state where the two messages 311 and 312 are stacked each other so that a new message is positioned below an old one.

The message 312 also pops up in front of other arbitrary windows in the informing area 310. The message 312 is also faded out automatically, and then disappears from the display screen 300. In other words, the function key service program 202 displays the message 312 in the informing area 310 for the predetermined time (for example, 9 sec). Immediately after the message 312 is displayed in the informing area 310 or when a given time elapses after the start of the display operation, the transparency of the window of the message 312 starts to continuously increase. With this processing, the message 312 disappears 9 sec after the start of the display operation.

FIG. 5 shows contents of the informing area 310 when the user presses Fn+F5 again while the messages 311 and 312 are displayed. In response to press of Fn+F5, the function key service program 202 changes the state of the touch pad 14 to the enabled state again. The function key service program 202 displays a message 313 indicating the changed current state of the touch pad (that is, indicating that the touch pad is in the enabled state), as shown in FIG. 5.

As shown in FIG. 5, the message 313 is displayed in the informing area 310 together with the messages 311 and 312 each indicating the past state of the touch pad 14. In other words, the message 313 is displayed below the already displayed message 312. As described above, the three messages 311, 312 and 313 are displayed in the state where the three messages 311, 312 and 313 are stacked each other so that a new message is positioned below an old one.

The message 313 also pops up in front of other arbitrary windows in the informing area 310. The message 313 is also faded out automatically, and then disappears from the display screen 300. In other words, the function key service program 202 displays the message 313 in the informing area 310 for the predetermined time (for example, 9 sec). Immediately after the message 313 is displayed in the informing area 310 or when a given time elapses after the start of the display operation, the transparency of the window of the message 313 starts to continuously increase. With this processing, the message 313 disappears 9 sec after the start of the display operation.

Assume that the user presses Fn+F5 again while the messages 311, 312, and 313 are displayed. In response to press of Fn+F5, the function key service program 202 changes the state of the touch pad 14 to the disabled state again. The function key service program 202 attempts to display a new message indicating the changed current state of the touch pad 14. However, the number of messages simultaneously displayable in the informing area 310 is limited to a given number, for example, three. The new message, therefore, cannot be displayed until a region in the informing area 310 is freed.

Since the message 311 disappears first, the upper region of the informing area 310 is free. The new message is displayed in the upper region of the informing area 310 in which the message 311 was displayed. After the message 311 disappears, the message 312 disappears. Another new message is, therefore, displayed in the middle region of the informing area 310 in which the message 312 was displayed. In this way, the display position of a new message is changed in a round-robin manner such that it moves from the upper region to the lower region of the informing area 310.

As described above, in this embodiment, if an old message indicating the past state of the touch pad 14 is being displayed in the informing area 310, a new message indicating the current state of the touch pad 14 is displayed in the informing area 310 together with the old message indicating the past state. It is, therefore, possible to inform the user of state transition of enabled→disabled→disabled so that he/she can understand it more easily than a case in which the user is informed of only the current state. When the user looks at a group of messages in the informing area 310, he/she can readily understand the state transition and current state of the touch pad 14.

Since the display position of a new message moves from the upper portion to the lower portion of the informing area 310, it is possible to provide dynamic information (movable message) to the user.

Since each message is faded out as described above, the color of the message (the background color of the window of the message or the like) is lighter (the transparency increases) as the message is older. The user can readily understand the state transition of the touch pad 14 by not only the positional relationship between messages but also a difference in color (transparency) between the messages.

Note that even when a combination of function keys corresponding to a function key service other than the touch pad ON/OFF function is pressed, the function key service program 202 uses the informing service incorporated in the OS 201 to display, in the informing area 310 for 9 sec, a message indicating a state changed by the executed function key service. As described above, messages corresponding to all the function key services are displayed in the informing area 310. It is, therefore, possible to use the same informing area 310 to inform the user of the states of various operational environments corresponding to all the function key services.

If, for example, pressing Fn+F2 switches the power plan to the eco mode, a message indicating the eco mode is displayed in the informing area 310. In the eco mode, for example, the brightness of the screen decreases, and the keyboard backlight 13A is turned off. If the user immediately presses Fn+Z in this state, the function key service program 202 changes the state of the keyboard backlight 13A to the ON state, and displays a message indicating that the keyboard backlight 13A is in the ON state in the informing area 310 together with the message indicating the eco mode.

In this case, since the message indicating that the keyboard backlight 13A is in the ON state is displayed below the message indicating the eco mode, the user can readily recognize that the current power plan is in the eco mode but the backlight is ON.

FIG. 6 shows messages for informing the user of the state of the touch pad 14.

A message 401 indicates that the state of the touch pad 14 has been changed to the enabled state. The background color of the window of the message 401 is, for example, white. A black image (icon) 401A representing a touch pad, and a text 401B as a character string "touch pad enabled" are arranged on the window of the message 401.

A message 402 indicates that the state of the touch pad 14 has been changed to the disabled state. The background color of the window of the message 402 is, for example, white. A gray image (icon) 402A representing a touch pad with a prohibition mark, and a text 402B as a character string "touch pad disabled" are arranged on the window of the message 402.

Figure 7:
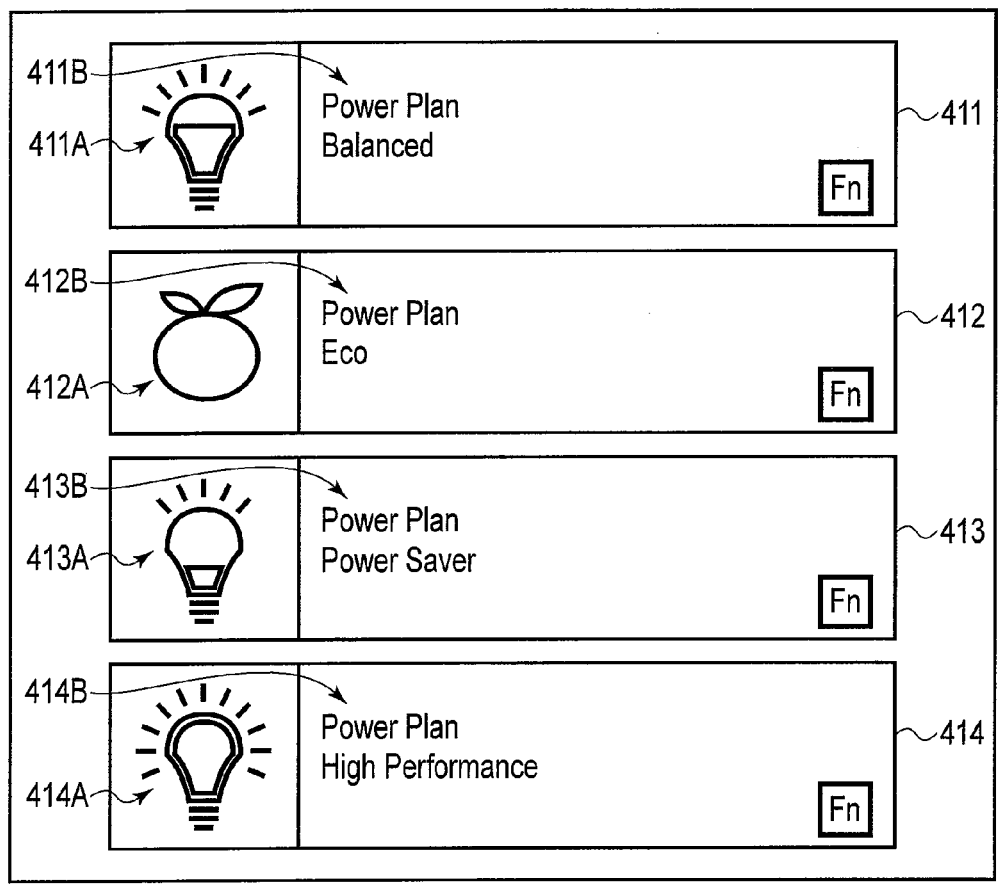
FIG. 7 is an exemplary view showing a group of messages for informing the user of power plan switching, which is used by the information processing apparatus according to the embodiment.

FIG. 7 shows messages for informing the user of the state of the power plan (power-saving setting).

A message 411 indicates that the power plan has been changed to the balanced mode. The background color of the window of the message 411 is, for example, white. An image (icon) 411A representing a lamp which is lighting with a medium amount of light, and a text 411B as a character string "power plan balanced" are arranged on the window of the message 411. A message 412 indicates that the power plan has been changed to the eco mode. The background color of the window of the message 412 is, for example, white. An image (icon) 412A of a design giving the impression of eco-friendliness, and a text 412B as a character string "power plan eco" are arranged on the window of the message 412.

A message 413 indicates that the power plan has been changed to the power-saving mode. The background color of the window of the message 413 is, for example, white. An image (icon) 413A representing a lamp which is lighting with a small amount of light, and a text 413B as a character string "power plan power saver" are arranged on the window of the message 413. A message 414 indicates that the power plan has been changed to the high-performance mode. The background color of the window of the message 414 is, for example, white. An image (icon) 414A representing a lamp which is lighting with a maximum amount of light, and a text 414B as a character string "power plan high performance" are arranged on the window of the message 414.

Figure 8:
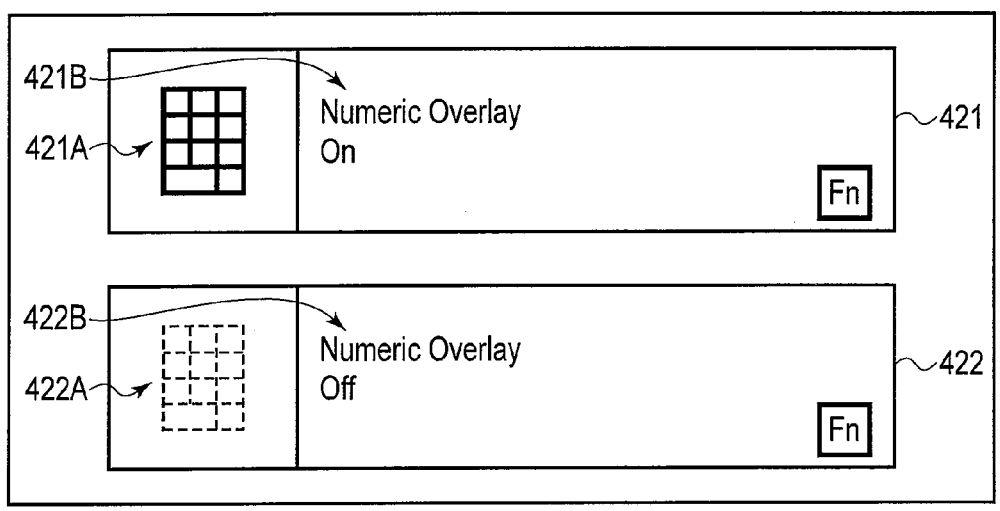
FIG. 8 is an exemplary view showing a group of messages for informing the user of numeric overlay switching, which is used by the information processing apparatus according to the embodiment.

FIG. 8 shows messages for informing the user of the state of the numerical overlay function.

A message 421 indicates that the state of the numerical overlay function has been changed to the enabled state. The background color of the window of the message 421 is, for example, white. A black image (icon) 421A representing a ten-key pad, and a text 421B as a character string "numerical overlay ON" are arranged on the window of the message 421.

A message 422 indicates that the state of the numerical overlay function has been changed to the disabled state. The background color of the window of the message 422 is, for example, white. A gray image (icon) 422A representing a ten-key pad, and a text 422B as a character string "numerical overlay OFF" are arranged on the window of the message 422.

Figure 9:
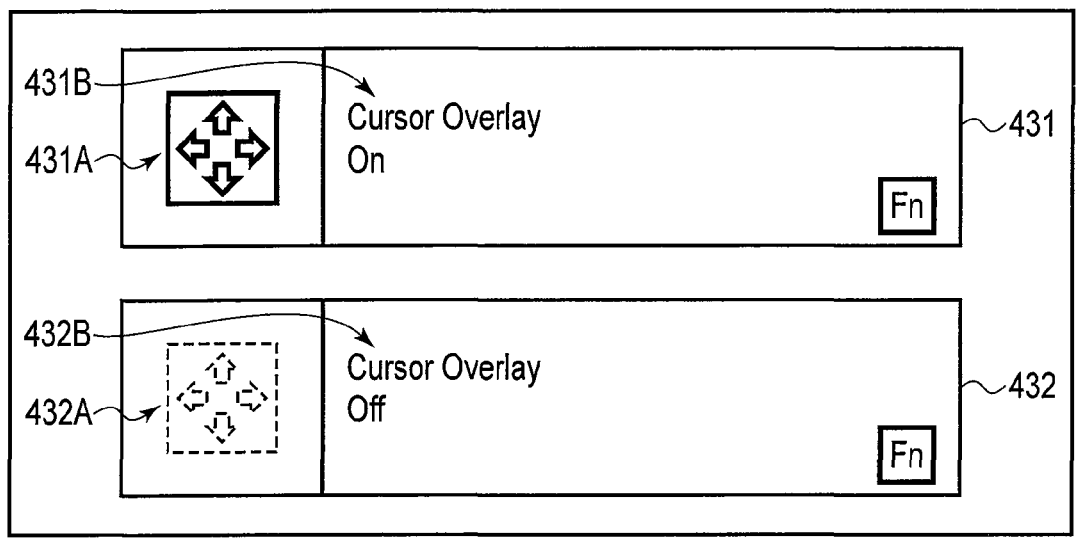
FIG. 9 is an exemplary view showing a group of messages for informing the user of cursor overlay switching, which is used by the information processing apparatus according to the embodiment.

FIG. 9 shows messages for informing the user of the state of the cursor overlay function.

A message 431 indicates that the state of the cursor overlay function has been changed to the enabled state. The background color of the window of the message 431 is, for example, white. A black image (icon) 431A representing four arrow keys, and a text 431B as a character string "cursor overlay ON" are arranged on the window of the message 431.

A message 432 indicates that the state of the cursor overlay function has been changed to the disabled state. The background color of the window of the message 432 is, for example, white. A gray image (icon) 432A representing four arrow keys, and a text 432B as a character string "cursor overlay OFF" are arranged on the window of the message 432.

Figure 10:
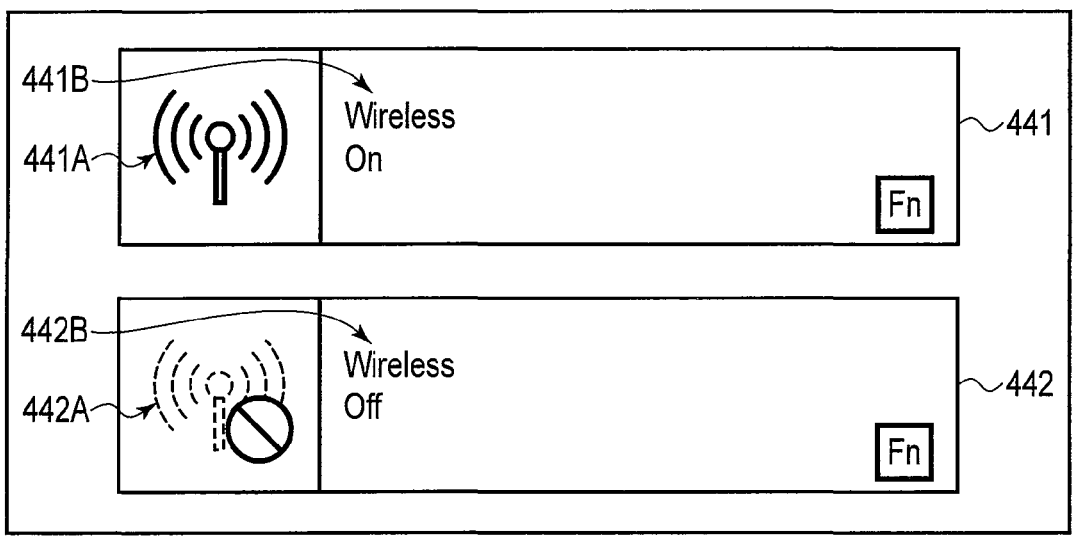
FIG. 10 is an exemplary view showing a group of messages for informing the user of wireless device ON/OFF switching, which is used by the information processing apparatus according to the embodiment.

FIG. 10 shows messages for informing the user of the state of the wireless communication function ON/OFF function.

A message 441 indicates that the state of the wireless communication function has been changed to the ON state. The background color of the window of the message 441 is, for example, white. A black image (icon) 441A representing an antenna, and a text 441B as a character string "wireless ON" are arranged on the window of the message 441.

A message 442 indicates that the state of the wireless communication function has been changed to the OFF state. The background color of the window of the message 442 is, for example, white. A gray image (icon) 442A representing an antenna with a prohibition mark, and a text 442B as a character string "wireless OFF" are arranged on the window of the message 442.

Figure 11:
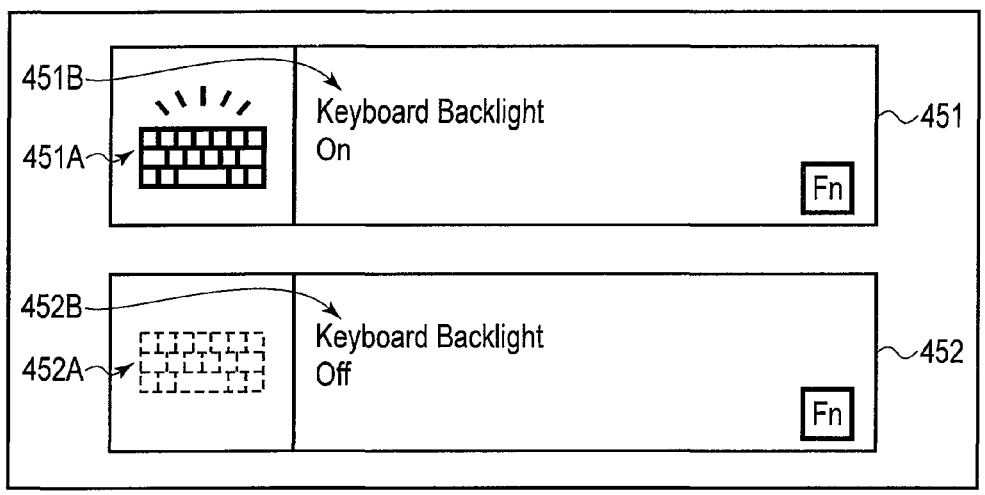
FIG. 11 is an exemplary view showing a group of messages for informing the user of keyboard backlight ON/OFF switching, which is used by the information processing apparatus according to the embodiment.

FIG. 11 shows messages for informing the user of the state of the keyboard backlight ON/OFF function.

A message 451 indicates that the state of the keyboard backlight 13A has been changed to the ON state. The background color of the window of the message 451 is, for example, white. A black image (icon) 451A representing a lighting keyboard, and a text 451B as a character string "keyboard backlight ON" are arranged on the window of the message 451.

A message 452 indicates that the state of the keyboard backlight 13A has been changed to the OFF state. The background color of the window of the message 452 is, for example, white. A gray image (icon) 452A representing a keyboard, and a text 452B as a character string "keyboard backlight OFF" are arranged on the window of the message 452.

Figure 12:
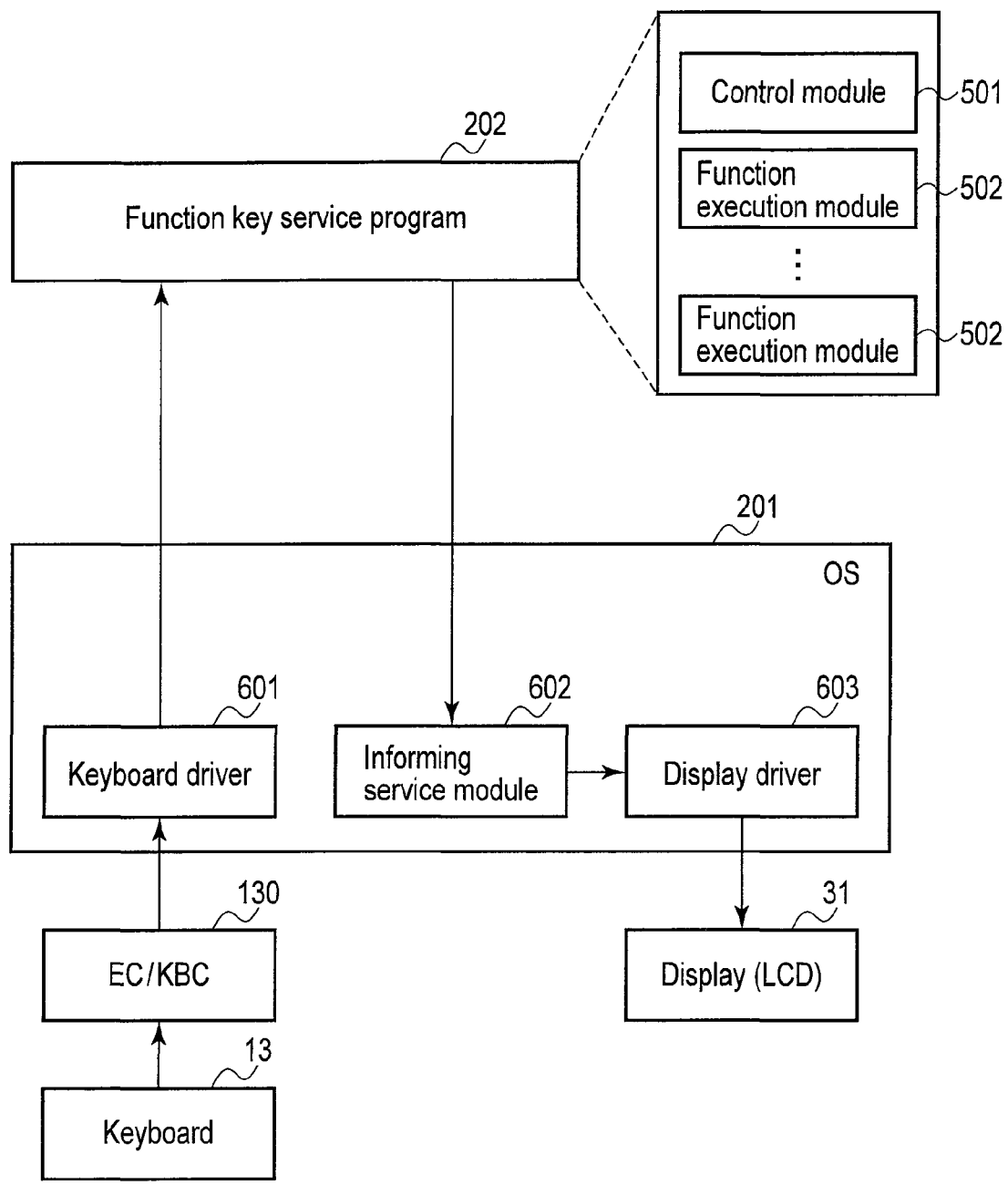
FIG. 12 is an exemplary block diagram for explaining the relationship between a function key service program and an informing service module which are respectively executed by the information processing apparatus according to the embodiment.

FIG. 12 shows the relationship between the function key service program 202 and an informing service module 602 of the OS 201.

When a specific key of the keyboard 13 is pressed in combination with the function key (Fn), the key code of the specific key and that of the Fn key are sent to the function key service program 202 via, for example, the EC/KBC 130 and a keyboard driver program 601 of the OS 201. Note that the key code of the specific key and that of the Fn key may be transmitted to the function key service program 202 via the BIOS, using a system management interrupt (SMI) or the like.

The function key service program 202 includes a control module 501 and a plurality of function execution modules 502. Based on the key code of the specific key and that of the Fn key received from the OS 201 or the BIOS, the control module 501 determines a function key service to be executed. The control module 501 calls the function execution module 502 corresponding to the determined function key service to execute a function corresponding to the determined function key service. That is, the control module 501 uses the function execution module 502 corresponding to the determined function key service to change an operational environment (touch pad, power plan setting, numerical overlay, cursor overlay, wireless communication function, keyboard backlight, or the like) assigned to the combination of the specific key and Fn key.

Furthermore, the control module 501 uses the informing service module 602 of the OS 201 to display a message indicating the current state of the changed operational environment in the informing area 310 of the display screen 300. In this case, the control module 501 sends, to the informing service module 602, informing contents, that is, contents (an image, a text, and the like) of the message indicating the current state of the changed operational environment. The informing service module 602 uses a display driver program 603 to display a message based on the informing contents in the informing area 310 for a predetermined period.

Figure 13:
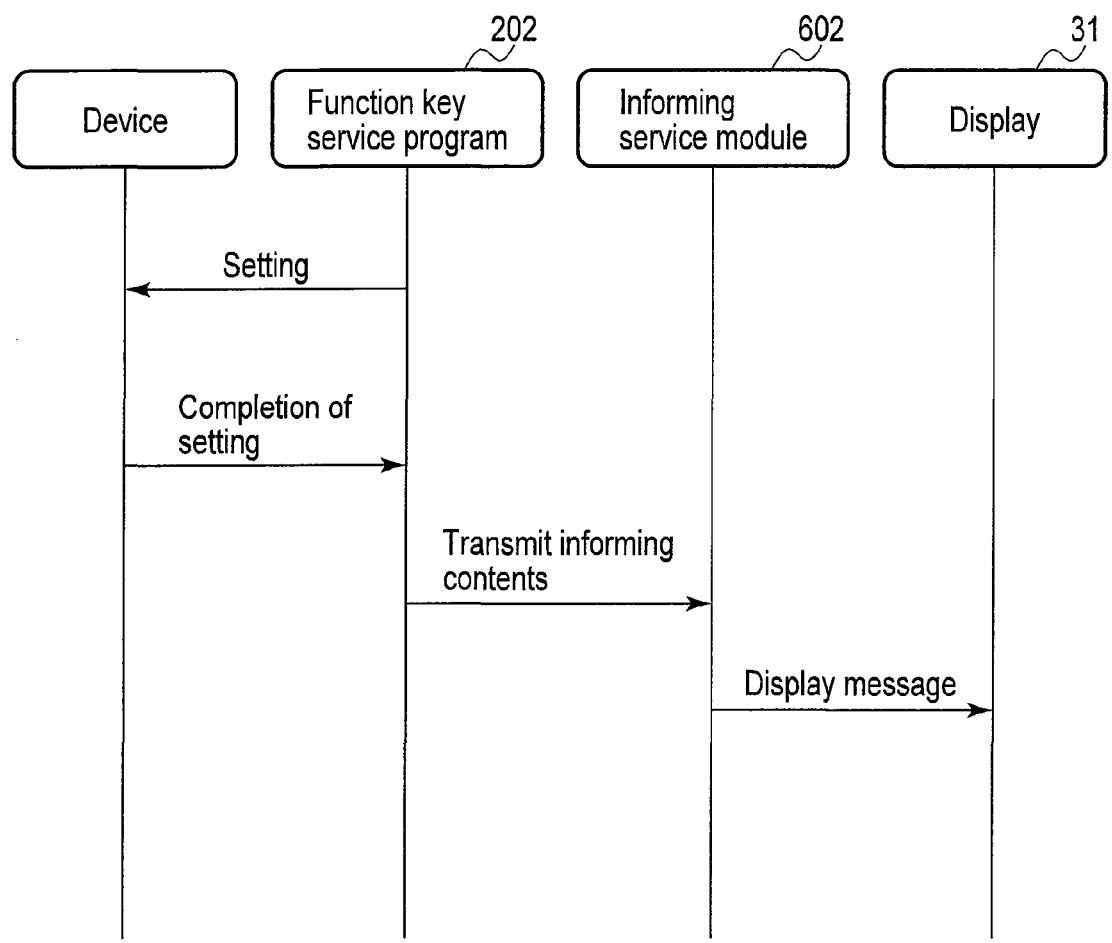
FIG. 13 is an exemplary sequence chart for explaining the operation of the function key service program and informing service module which are respectively executed by the information processing apparatus according to the embodiment.

FIG. 13 shows the operation of the function key service program 202 and informing service module 602. In this example, the touch pad ON/OFF function will be exemplified to describe the operation of the function key service program 202 and informing service module 602.

Upon press of Fn+F5, the function key service program 202 uses the function execution module 502 corresponding to the touch pad ON/OFF function to set the touch pad 14 in the ON or OFF state. Upon completion of the operation of setting the touch pad 14 in the ON or OFF state, the function key service program 202 transmits informing contents to the informing service module 602. Based on the informing contents, the informing service module 602 displays the above-described message 401 or 402 in the informing area 310 of the display screen of the display 31.

Figure 14:
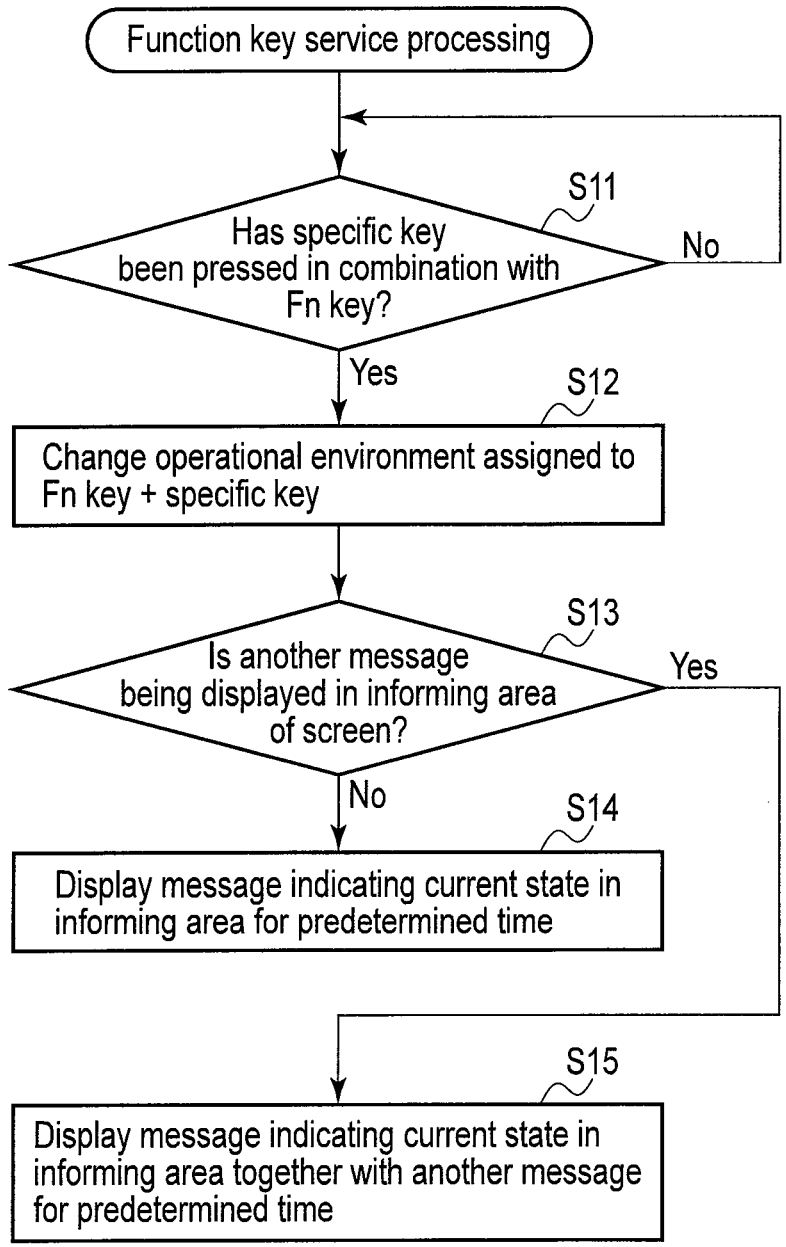
FIG. 14 is an exemplary flowchart illustrating the procedure of function key service processing executed by the information processing apparatus according to the embodiment.

FIG. 14 is a flowchart illustrating the procedure of function key service processing executed by the function key service program 202.

When a specific key is pressed in combination with the Fn key (YES in step S11), the function key service program 202 changes an operational environment assigned to the combination of the Fn key and specific key (step S12). If, for example, the user presses Fn+F5, the function key service program 202 switches the state of the touch pad 14 between the ON state and the OFF state. The function key service program 202 uses the informing service module 602 to execute processing of informing the user of the current state of the changed operational environment (steps S13 to S15). If, for example, the state of the touch pad 14 is changed to the ON state in step S12, a new message indicating the changed current state (ON state) of the touch pad 14 is displayed in the informing area 310. If an old message indicating the past state (OFF state) of the touch pad 14 is being displayed in the informing area 310, the new message indicating the current state (ON state) of the touch pad 14 is displayed in the informing area 310 together with the old message indicating the past state (OFF state) of the touch pad 14. The informing service module 602 can execute the processing in steps S13 to S15.

More specifically, the informing service module 602 determines whether another message is being displayed in the informing area 310 (step S13). If no other messages are being displayed (NO in step S13), the informing service module 602 displays the new message indicating the current state (ON state) of the touch pad 14 in the upper region of the informing area 310 for a predetermined time (step S14). This new message stays in the informing area 310 for the predetermined time after the start of the display operation. That is, the informing service module 602 erases the new message when the predetermined time elapses after the start of display of the new message. In this case, the informing service module 602 fades out the new message to disappear when the predetermined time elapses after the start of the display operation. Therefore, the color of the new message becomes lighter (the transparency increases) with time.

On the other hand, if another message such as the old message indicating the past state (OFF state) of the touch pad 14 is being displayed (YES in step S13), the informing service module 602 displays the new message indicating the changed current state (ON state) of the touch pad 14 in the informing area 310 together with the other message for the predetermined time (step S15). As described above, the new message stays in the informing area 310 for the predetermined time after the start of the display operation. That is, the informing service module 602 erases the new message when the predetermined time elapses after the start of display of the new message. In this case, the informing service module 602 fades out the new message to disappear when the predetermined time elapses after the start of the display operation. Therefore, the color of the new message becomes lighter (the transparency increases) with time. Similarly, the other message also stays in the informing area 310 for the predetermined time after the start of display of the message. That is, the informing service module 602 erases the other message when the predetermined time elapses after the start of display of the other message. The other message is also faded out so that its color becomes lighter (the transparency increases) with time.

Figure 15:
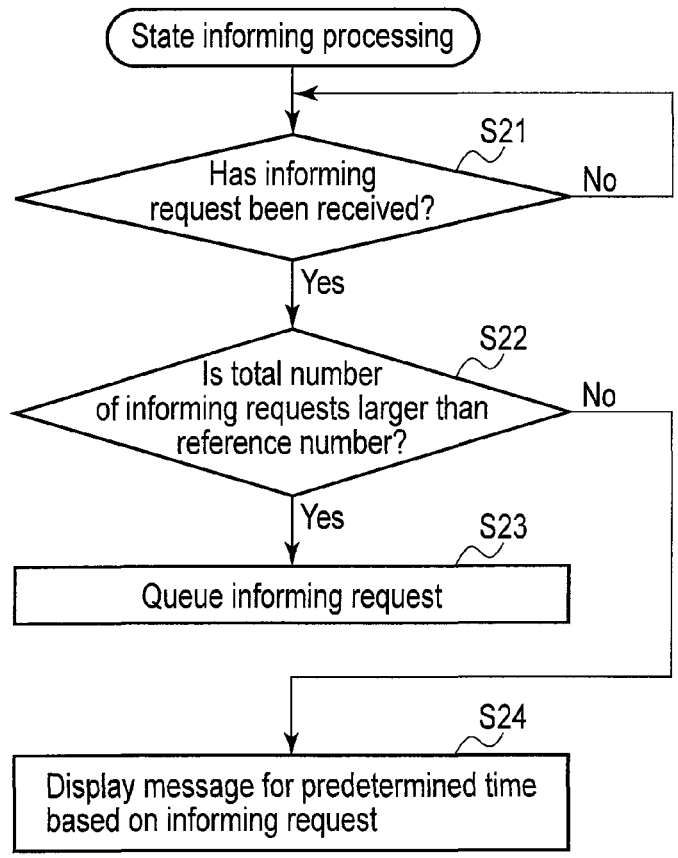
FIG. 15 is an exemplary flowchart illustrating the procedure of state informing processing executed by the information processing apparatus according to the embodiment.

FIG. 15 is a flowchart illustrating the procedure of the state informing processing executed by the informing service module 602.

Upon receiving a new informing request from the function key service program 202 (YES in step S21), the informing service module 602 determines whether the total number of received informing requests is larger than a reference number (in this example, three), that is, whether there is a free region in the informing area 310 (step S22).

If there is a free region in the informing area 310 (NO in step S22), the informing service module 602 displays, based on informing contents contained in the received new informing request, a message indicating a changed current state in the free region of the informing area 310 for a predetermined time (step S24). If, for example, the informing area 310 includes three display regions, the informing service module 602 specifies, among the three display regions, an unused region (free region) positioned at the top, and displays the message in the specified region.

On the other hand, if the total number of received informing requests is larger than the reference number, that is, there is no free region in the informing area 310 (YES in step S22), the informing service module 602 puts the received new informing request into a waiting queue (step S23). The informing service module 602 stands by until a region in the informing area 310 is freed when the old message being displayed disappears. When a region in the informing area 310 is freed (NO in step S22), the informing service module 602 displays, based on the informing contents contained in the received new informing request, the message indicating the changed current state in the free region of the informing area 310 for the predetermined time (step S24). In step S24, the informing service module 602 causes the window of the message to pop up in the free region of the informing area 310. The informing service module 602 fades out the message so that the color of the window of the message continuously becomes lighter (the transparency of the window continuously increases), and erases the window of the message when the predetermined time elapses after the start of display of the message.

Figure 16:
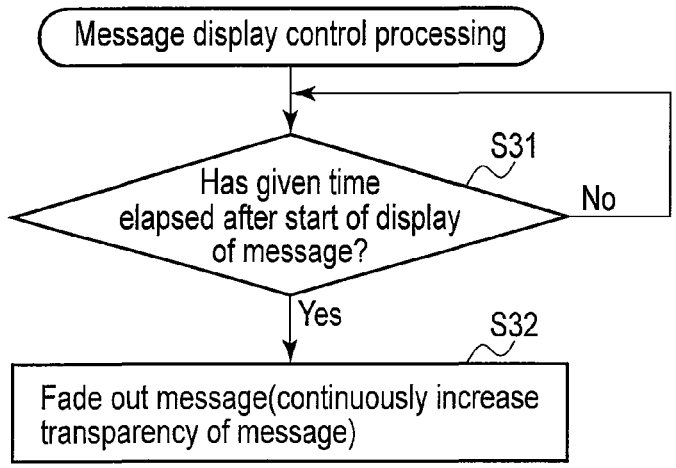
FIG. 16 is an exemplary flowchart illustrating the procedure of message display control processing executed by the information processing apparatus according to the embodiment.

FIG. 16 is a flowchart illustrating the procedure of message display processing executed by the informing service module 602.

If a given message is displayed, the informing service module 602 determines whether a given time has elapsed after the start of display of the message (step S31). If the given time (set to a time shorter than 9 sec) has elapsed after the start of display of the message (YES in step S31), the informing service module 602 fades out the message to disappear 9 sec after the start of display of the message (step S32). In step S32, the informing service module 602 continuously increases the transparency of the message, that is, the transparency of the background of the window of the message, that of an image (icon), and that of a text.

Note that although a case in which fading out the message starts when the given time elapses after the start of display of the message has been described, fading out the message may start immediately after the start of display of the message. In this case, the message is continuously faded out over a period of 9 sec.

As described above, according to this embodiment, if the second message indicating the past state of the first operational environment is being displayed in the informing area 310, the first message indicating the current state of the changed first operational environment is displayed in the informing area 310 together with the second message. It is, therefore, possible to inform the user of state transition of the first operational environment so that he/she can understand it more easily than a case in which the user is informed of only the first message. When the user looks at a group of messages in the informing area 310, he/she can readily understand the state transition and current state of the first operational environment.

Note that a computer program can implement the processing procedure according to this embodiment. It is, therefore, possible to readily obtain the same effects as those in this embodiment by only installing the computer program into a computer through a computer-readable storage medium storing the computer program, and executing it.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a keyboard;
   a state change controller configured to change, when a first key of the keyboard is pressed, a state of a first operational environment of the information processing apparatus; and
   a display processor configured to display a first message indicative of a current state of the first operational environment in an informing area of a display screen for a first duration of time, and when a second message indicative of a past state of the first operational environment is displayed by the display processor for the first duration of time in the informing area, the display processor is further configured to display the first message in the informing area together with the second message.

2. The apparatus of claim 1, wherein the display processor is further configured to remove the first message when the first duration of time elapses after start of display of the first message, and remove the second message when the first duration of time elapses after start of display of the second message.

3. The apparatus of claim 1, wherein the display processor is further configured to fade out the first message such that the first message disappears when the first duration of time elapses after start of display of the first message, and fade out the second message such that the second message disappears when the first duration of time elapses after start of display of the second message.

4. The apparatus of claim 3, wherein the display processor is further configured to fade out the first message such that a color of the first message continuously becomes lighter, and fade out the second message such that a color of the second message continuously becomes lighter.

5. The apparatus of claim 1, wherein the display processor is further configured to display the first message in the informing area such that the first message and the second message are stacked each other.

6. The apparatus of claim 1, wherein the first operational environment is an operational environment associated with one of a power-saving setting of the information processing apparatus, an enabled/disabled state of a touch pad of the information processing apparatus, an ON/OFF state of a wireless communication device of the information processing apparatus, and an ON/OFF state of a keyboard backlight of the information processing apparatus.

7. The apparatus of claim 1, wherein
   when a second key of the keyboard is pressed, the state change controller is configured to change a second operational environment of the information processing apparatus, and
   when the first message is being displayed in the informing area, the display processor is configured to display a third message indicative of a current state of the second operational environment in the informing area together with the first message for the first duration of time.

8. The apparatus of claim 7, wherein the first operational environment is an operational environment associated with a power-saving setting of the information processing apparatus, and the second operational environment is an operational environment associated with an ON/OFF state of a keyboard backlight of the information processing apparatus.

9. An operation control method for an information processing apparatus, comprising:
   changing, when a first key of a keyboard of the information processing apparatus is pressed, a state of a first operational environment of the information processing apparatus; and
   displaying a first message indicative of a current state of the first operational environment in an informing area of a display screen for a first duration of time, wherein
   the displaying comprises displaying the first message in the informing area together with a second message, when the second message indicative of a past state of the first operational environment is displayed for the first duration of time in the informing area.

10. A computer-readable, non-transitory storage medium comprising a computer program configured to be executed by a computer, the computer program controlling the computer to execute functions of:
   changing, when a first key of a keyboard of the computer is pressed, a state of a first operational environment of the computer; and
   displaying a first message indicative of a current state of the first operational environment in an informing area of a display screen for a first duration of time,
   the function of displaying comprising displaying the first message in the informing area together with a second message, when the second message indicative of a past state of the first operational environment is displayed for the first duration of time in the informing area.

* * * * *